United States Patent [19]

Mark et al.

[11] Patent Number: 4,463,160

[45] Date of Patent: Jul. 31, 1984

[54] POLYARYLATES EXHIBITING IMPROVED HEAT RESISTANCE

[75] Inventors: Victor Mark, Evansville; Charles V. Hedges, Mt. Vernon, both of Ind.

[73] Assignee: General Electric Company, Mt. Vernon, Ind.

[21] Appl. No.: 451,106

[22] Filed: Dec. 17, 1982

[51] Int. Cl.³ .............................................. C08G 63/18
[52] U.S. Cl. .................................... 528/176; 528/125; 528/128; 528/173; 528/191; 528/193; 528/194
[58] Field of Search ............... 528/125, 128, 173, 176, 528/191, 193, 194

[56] References Cited

U.S. PATENT DOCUMENTS

| | | | |
|---|---|---|---|
| 3,317,464 | 5/1967 | Conix | 528/176 |
| 3,351,624 | 11/1967 | Conix | 528/176 |
| 3,498,950 | 3/1970 | Shatz et al. | 528/176 |
| 4,294,956 | 10/1981 | Berger et al. | 528/176 |

*Primary Examiner*—Lester L. Lee
*Attorney, Agent, or Firm*—Martin B. Barancik; Myron B. Kapustij

[57] ABSTRACT

Polyarylates derived from (i) at least one aromatic dicarboxylic acid, and (ii) at least one branched dihydric phenol wherein branching occurs on the carbon atom adjacent the benzylic carbon atom.

25 Claims, No Drawings

POLYARYLATES EXHIBITING IMPROVED HEAT RESISTANCE

BACKGROUND OF THE INVENTION

Polyarylate resins are high molecular weight thermoplastics which, due to their many advantageous properties, are finding increasing use as engineering thermoplastic materials in many commercial and industrial applications. Polyarylates are generally linear aromatic polymers containing repeating aromatic ester structural units in the polymer chain. The polyarylates are in general derived from dihydric phenols and aromatic dicarboxylic acids or their reactive derivatives.

While the conventional polyarylates are in general quite suitable for a variety of uses, there nevertheless exists a need, especially in high temperature environments, for polyarylates exhibiting, to a substantial degree, most of the advantageous properties of conventional polyarylates and simultaneously exhibiting higher heat resistance than that possessed by the conventional polyarylates.

It is, therefore, an object of the instant invention to provide polyarylates which exhibit, to a substantial degree, substantially most of the advantageous properties of conventional polyarylates while simultaneously exhibiting improved heat resistance.

SUMMARY OF THE INVENTION

In accordance with the instant invention there are provided novel polyarylates exhibiting, to a substantial degree, substantially most of the advantageous properties of conventional polyarylates and simultaneously exhibiting improved heat resistance. The novel polyarylates of the instant invention are formulated from (i) at least one aromatic dicarboxylic acid; and (ii) at least one dihydric phenol selected from certain specific branched dihydric phenols.

DESCRIPTION OF THE INVENTION

In accordance with the instant invention there are provided novel polyarylate resins exhibiting improved heat resistance. These polyarylates are derived from (i) at least one aromatic dicarboxylic acid or a reactive derivative thereof; and (ii) at least one dihydric phenol selected from certain specific branched dihydric phenols.

The branched dihydric phenols utilized in the production of the polyarylates of the instant invention are selected from dihydric phenols represented by the general formulae

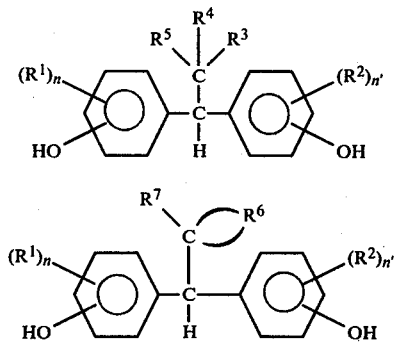

In Formula I:

each $R^1$ is independently selected from halogen radicals, monovalent hydrocarbon radicals, and monovalent hydrocarbonoxy radicals;

each $R^2$ is independently selected from halogen radicals, monovalent hydrocarbon radicals, and monovalent hydrocarbonoxy radicals;

$R^3$ is selected from hydrogen and monovalent hydrocarbon radicals;

$R^4$ and $R^5$ are independently selected from monovalent hydrocarbon radicals, with the proviso that if $R^3$ is hydrogen then at least one of the monovalent hydrocarbon radicals represented by $R^4$ and $R^5$ contains at least two carbon atoms;

n and n' are independently selected from whole numbers having a value of from 0 to 4 inclusive.

In Formula II $R^1$, $R^2$, n and n' are as defined hereinafore. $R^7$ in Formula II is selected from hydrogen and monovalent hydrocarbon radicals, while $R^6$ represents a divalent hydrocarbon radical which together with the C radical to which it is bonded forms a cyclic hydrocarbon structure.

The preferred halogen radicals represented by $R^1$ and $R^2$ are chlorine and bromine.

The monovalent hydrocarbon radicals represented by $R^1$ and $R^2$ are selected from alkyl radicals, aryl radicals, alkaryl radicals, aralkyl radicals, and cycloalkyl radicals. The preferred alkyl radicals represented by $R^1$ and $R^2$ are those containing from 1 to about 6 carbon atoms. These preferred alkyl radicals include the straight chain and the branched alkyl radicals. Some non-limiting illustrative examples of these preferred alkyl radicals include methyl, ethyl, propyl, isopropyl, butyl, isobutyl, and the like. The preferred aryl radicals represented by $R^1$ and $R^2$ are those containing from 6 to 12 carbon atoms and include phenyl, naphthyl and biphenyl. The preferred alkaryl and aralkyl radicals represented by $R^1$ and $R^2$ are those containing from 7 to about 14 carbon atoms, and include benzyl, tolyl, ethylphenyl, and the like. The preferred cycloalkyl radicals represented by $R^1$ and $R^2$ are those containing from 4 to about 8 ring carbon atoms and include cyclopropyl, cyclopentyl, cyclohexyl, and the like.

The monovalent hydrocarbonoxy radicals represented by $R^1$ and $R^2$ are preferably selected from alkoxy radicals and aryloxy radicals. The preferred alkoxy radicals are those containing from 1 to about 6 carbon atoms. The preferred aryloxy radical is the phenoxy radical.

In the dihydric phenols of Formulae I and II when more than one $R^1$ substituent is present, i.e., when n is equal to from 2–4, they may be the same or different. The same is true for the $R^2$ substituent. If n and n' are zero then the ring carbon atoms of the aromatic nuclear residue are substituted with hydrogen atoms.

The monovalent hydrocarbon radicals represented by $R^3$, $R^4$, $R^5$ and $R^7$ are selected from alkyl radicals, cycloalkyl radicals, aryl radicals, alkaryl radicals, and aralkyl radicals.

The preferred alkyl radicals represented by $R^3$, $R^4$, $R^5$ and $R^7$ are those containing from 1 to about 8 carbon atoms. These alkyl radicals include the branched alkyl radicals and the straight chain alkyl radicals. Some illustrative non-limiting examples of these preferred alkyl radicals include methyl, ethyl, propyl, butyl, isobutyl, tertiarybutyl, pentyl, neopentyl, and the like.

The preferred aryl radicals represented by $R^3$, $R^4$, $R^5$ and $R^7$ are those containing from 6 to 12 carbon atoms, i.e., phenyl, naphthyl and biphenyl. The preferred alkaryl and aralkyl radicals are those containing from 7 to about 14 carbon atoms. Some illustrative non-limiting examples of these preferred alkaryl and aralkyl radicals include benzyl, tolyl, ethylphenyl, and the like.

The preferred cycloalkyl radicals represented by $R^3$, $R^4$, $R^5$ and $R^7$ are those containing from 4 to about 8 ring carbon atoms. Some illustrative non-limiting examples of these preferred cycloalkyl radicals include cyclobutyl, cyclopentyl, cyclohexyl, and the like.

As mentioned previously $R^6$ is a divalent hydrocarbon radical which together with the

radical forms a cyclic hydrocarbon structure. This cyclic hydrocarbon structure may be monocyclic or bicyclic. Preferably $R^6$ is an alkylene radical containing from 3 to about 7 carbon atoms so that a cyclic structure containing from 4 to about 8 ring carbon atoms is formed. Some illustrative non-limiting examples of alkylene radicals represented by $R^6$ include propylene, butylene, pentylene, and the like.

Some illustrative non-limiting examples of the cyclic structures formed by $R^6$ and the carbon radical described above to which $R^6$ is bonded include:

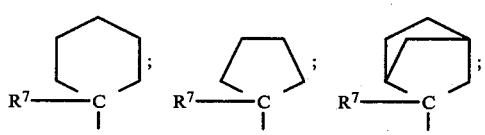

and the like.

Particularly useful, and sometimes even preferred, dihydric phenols of Formula I are those wherein each of $R^3$, $R^4$ and $R^5$ is independently selected from monovalent hydrocarbon radicals.

The dihydric phenols of Formulae I and II, as well as the methods for their preparation, are more fully set forth in copending U.S. Application of Mark and Hedges, Ser. No. 451,109, filed on the same day as the instant application, which is hereby incorporated herein by reference.

Generally, the novel dihydric phenols of Formulae I and II are obtained by the reaction of a particular aldehyde with a phenol in the presence of an acid catalyst. The particular aldehyde reactant is selected from aldehydes represented by the general formulae

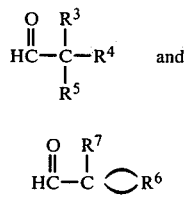

wherein $R^3$, $R^4$, $R^5$, $R^6$ and $R^7$ are as defined hereinafore. The phenol reactants are selected from phenols represented by the general formulae

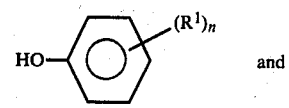

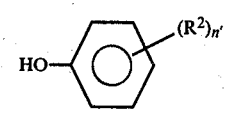

wherein $R^1$, $R^2$, n and n' are as defined hereinafore.

In order to obtain the dihydric phenols of Formula I one mole of an aldehyde of Formula III is reacted with one mole of a phenol of Formula V and one mole of a phenol of Formula VI in the presence of an acid catalyst. Some illustrative non-limiting examples of suitable acid catalysts that may be employed include hydrochloric acid, hydrobromic acid, poly(styrene sulfonic acid), sulfuric acid, benzene sulfonic acid, and the like. The phenols of Formulae V and VI are reacted with the aldehyde of Formula III under conditions of temperature and pressure, and in the presence of said acid catalyst, such that coreaction between said phenols and said aldehyde will occur to form the dihydric phenol of Formula I. The reaction generally proceeds satisfactorily at about one atmosphere of pressure and at temperatures of from room temperature to about 100° C.

The amount of the acid catalyst employed is a catalytic amount. By catalytic amount is meant an amount effective to catalyze the reaction between the aldehyde and the phenol. Generally this amount is in the range of from about 0.1 to about 10 weight percent.

The phenols of Formula V and Formula VI may be identical. In such a case one mole of the aldehyde of Formula III is reacted with two moles of the phenol.

In order to obtain the dihydric phenols of Formula II one mole of an aldehyde of Formula IV is reacted with one mole of the phenol of Formula V and one mole of the phenol of Formula VI, or if the phenols of Formula V and VI are identical, with two moles of the phenol, under the reaction conditions and in the presence of the acid catalyst as set forth supra to produce the dihydric phenol of Formula II.

Some illustrative non-limiting examples of the dihydric phenols represented by Formula I include:

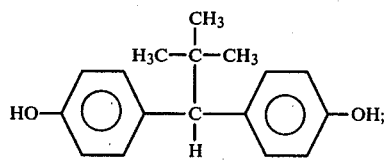

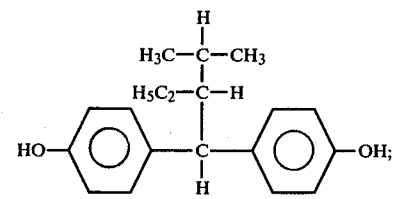

-continued

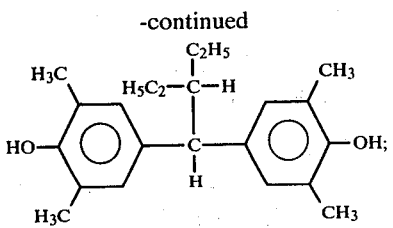

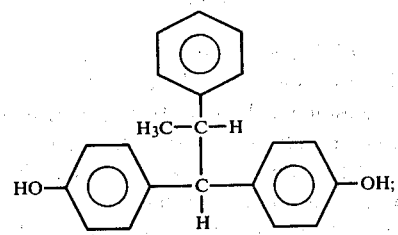

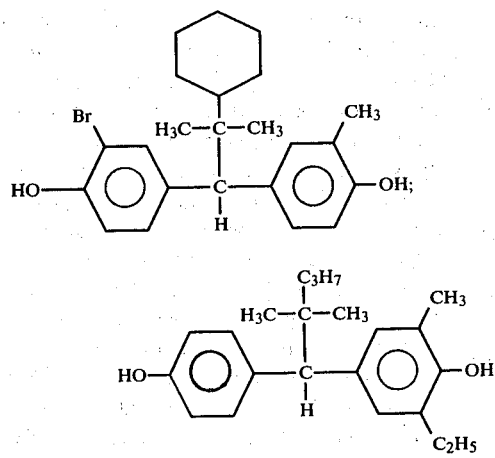

and the like

Some illustrative non-limiting examples of the dihydric phenols represented by Formula II include:

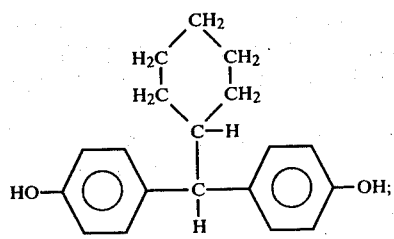

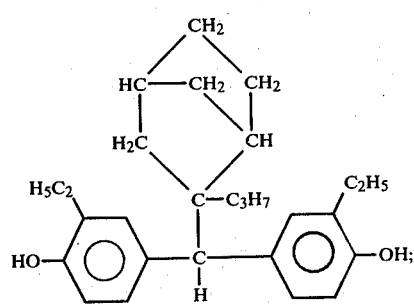

-continued

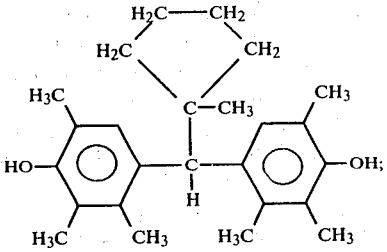

and the like.

In the preparation of the polyarylates of the instant invention only one dihydric phenol of Formulae I or II may be used. Alternately, a mixture of two or more different dihydric phenols of Formulae I and/or II may be employed. Thus, for example, two or more different dihydric phenols of Formula I may be used; two or more different dihydric phenols of Formula II may be used; or at least one dihydric phenol of Formula I and at least one dihydric phenol of Formula II may be utilized.

The aromatic dicarboxylic acids which are reacted with at least one dihydric phenol selected from dihydric phenols represented by Formulae I and II to produce the instant polyarylates are well known and are commercially available or may readily be prepared by known methods. In general, any aromatic dicarboxylic acid conventionally used in the preparation of polyesters may be utilized. These aromatic carboxylic acids may be represented by the general formula HOOC—Ar—COOH         (VII)

wherein Ar is selected from divalent aromatic radicals, preferably those containing from 6 to about 18 carbon atoms, such as phenylene, naphthylene, biphenylene, substituted phenylene, substituted naphthylene, and the like. These divalent aromatic radicals, when substituted, are preferably substituted with alkyl radicals or halogen radicals (preferably chlorine and bromine). In Formula VII Ar may also be selected from radicals of the type —Ar'—$R^8$—Ar'— wherein Ar' is independently selected from divalent aromatic radicals of the type described for Ar; and $R^8$ is an alkylene radical containing from 2 to about 6 carbon atoms, an alkylidene radical containing from 1 to about 6 carbon atoms, a cycloalkylidene radical containing from 4 to about 7 ring carbon atoms, or a cycloalkylene radical containing from 4 to about 7 ring carbon atoms.

Preferred aromatic dicarboxylic acids are those represented by the general formula

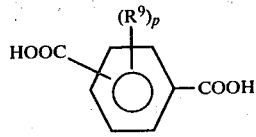         VIII.

wherein $R^9$ is independently selected from alkyl radicals, preferably those alkyl radicals containing from 1 to about 6 carbon atoms, and halogen radicals, preferably chlorine and bromine; and p represents a whole number having a value of from 0 to 4 inclusive. In Formula VIII when more than one $R^9$ substituent is present they may be the same or different.

Some illustrative non-limiting examples of aromatic dicarboxylic acids represented by Formula VIII include isophthalic acid, terephthalic acid, and the like.

It is possible, in preparing the instant polyarylates, to use only one dicarboxylic acid of Formula VII, or to employ a mixture of two or more different acids. Thus, when the term aromatic dicarboxylic acid is used herein it is meant to include individual aromatic dicarboxylic acids and mixtures of two or more different aromatic dicarboxylic acids.

Instead of using the aromatic dicarboxylic acids per se it is possible, and sometimes even preferred, to use their respective reactive derivatives. The preferred reactive derivatives are the acid dihalides, with the acid dichlodrides being the preferred acid dihalides. Thus, for example, instead of utilizing isophthalic acid, terephthalic, acid, or mixtures thereof, it is possible to employ terephthaloyl dichloride, isophthaloyl dichloride, or mixtures thereof.

The preparation of the instant polyarylates from the instant dihydric phenols and the aromatic dicarboxylic acids or their reactive derivatives may be accomplished by known methods such as, for example, heterogeneous interfacial polymerization, solution condensation polymerization, melt condensation polymerization, and the like.

Most conveniently, the instant polyarylates may be prepared from equimolar or nearly equimolar amounts of (i) at least one dihydric phenol selected from dihydric phenols represented by Formulae I and II, and (ii) at least one aromatic dicarboxylic acid or a reactive derivative thereof by the interfacial polymerization technique. In accordance with the usual interfacial polymerization procedure, the reactants are present in different liquid phases which are immiscible and which, in the preparation of the present polymers, constitute two solvent media. Thus the dihydric phenol is dissolved in one solvent medium, the aromatic dicarboxylic acid or its reactive derivative such as the acid chloride is dissolved in a second solvent medium immiscible with the first, and the solutions are combined. Normally, an alkaline aqueous medium serves as the solvent for the dihydric phenol, and an organic solvent is utilized for the acid or the acid dichloride, said organic solvent being so chosen that it either dissolves the polyarylate produced or serves as a swelling medium. Also present during the reaction are catalysts and chain stoppers or molecular weight regulators.

The catalysts which can be employed in the interfacial polymerization process may be any of the well known catalysts that aid the interfacial polymerization reaction of the dihydric phenol and the aromatic dicarboxylic acid or its reactive derivative. Suitable catalysts include, but are not limited to, tertiary amines, quaternary ammonium compounds, quaternary phosphonium compounds, and the like.

The molecular weight regulators employed may be any of the well known compounds that regulate the molecular weight of the polyarylate by a chain-stopping or terminating mechanism. These compounds include, but are not limited to, phenol, tertiarybutyl phenol, and the like.

The temperature at which the polymerization reaction proceeds may vary from below 0° C. to above 100° C. The polymerization reaction proceeds satisfactorily at temperatures from room temperature (25° C.) to about 50° C.

The polyraylates of the instant invention will contain at least one repeating structural unit selected from structural units represented by the general formulae

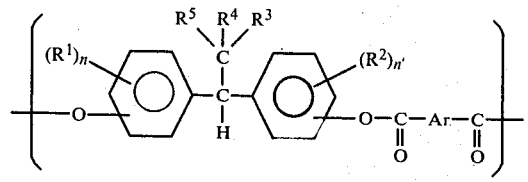

and

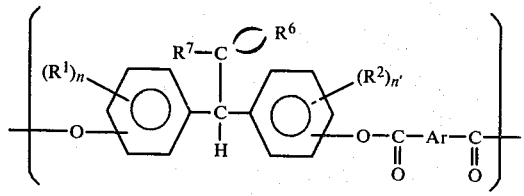

If only dihydric phenols of Formula I are employed then the corresponding polyarylate will contain repeating structural units of Formula IX. If only dihydric phenols of Formula II are employed then the corresponding polyarylate will contain repeating structural units of Formula X. If dihydric phenols of Formulae I and II are employed then the corresponding polyraylate will contain repeating structural units of Formulae IX and X.

The polyarylates of the instant invention generally have a weight average molecular weight in the range of from about 10,000 to about 200,000, preferably in the range of from about 20,000 to about 100,000.

The instant polyarylates exhibit improved heat resistance, specifically improved second order glass transition temperatures (Tg), over comparable conventional prior art polyarylates such as those derived from bisphenol-A.

The polyarylates of the instant invention may optionally have admixed therewith the commonly known and used additives such as antioxidants; antistatic agents; fillers such as glass fibers, talc, mica, clay, and the like; ultraviolet radiation absorbers such as the benzophenones and the benzotriazoles; hydrolytic stabilizers such as the epoxides disclosed in U.S. Pat. Nos. 3,489,716; 4,138,379 and 3,839,247, all of which are incorporated herein by reference; color stabilizers such as the organophosphites; flame retardants; and the like.

Some particularly useful flame retardants are the alkali and alkaline earth metal salts of sulfonic acids. These types of flame retardants are disclosed in U.S. Pat. Nos. 3,933,734; 3,948,851; 3,926,908; 3,919,167; 3,909,490; 3,953,396; 3,931,100; 3,978,024; 3,953,399; 3,917,559; 3,951,910 and 3,940,366, all of which are hereby incorporated herein by reference.

Another embodiment of the instant invention is a polyarylaye derived from (i) at least one aromatic dicarboxylic acid or a reactive derivative thereof; (ii) at least one dihydric phenol selected from dihydric phenols represented by the general Formulae I and II; and (iii) at least one conventional dihydric phenol represented by the general formula

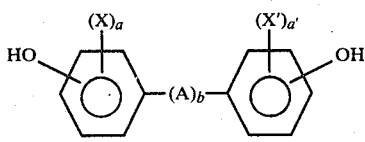

wherein:

A represents a straight chain alkylene radical, preferably one containing from 2 to about 6 carbon atoms, a straight chain alkylidene radical, preferably one containing from 1 to about 6 carbon atoms, a cycloalkylene radical, preferably one containing from 4 to about 7 ring carbon atoms, a cycloalkylidene radical, preferably one containing from 4 to about 7 ring carbon atoms,

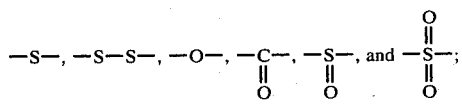

each X is independently selected from halogen radicals, monovalent hydrocarbon radicals, and monovalent hydrocarbonoxy radicals;

each X' is independently selected from halogen radicals, monovalent hydrocarbon radicals, and monovalent hydrocarbonoxy radicals;

a and a' are independently selected from whole numbers having a value of from 0 to 4 inclusive; and b is either zero or one.

The monovalent hydrocarbon radicals represented by X and X' include the alkyl radicals, both straight chain and branched, and preferably those that contain from 1 to about 6 carbon atoms; aryl radicals, preferably those containing from 6 to 12 carbon atoms such as phenyl, naphthyl, and biphenyl; alkaryl radicals and aralkyl radicals, preferably those containing from 7 to about 14 carbon atoms; and the cycloalkyl radicals, preferably those containing from 4 to about 7 ring carbon atoms.

The preferred halogen radicals represented by X and X' are chlorine and bromine.

The preferred monovalent hydrocarbonoxy radicals represented by X and X' are the alkoxy radicals, preferably those containng from 1 to about 6 carbon atoms, and the aryloxy radicals, preferably phenoxy.

In the dihydric phenols represented by Formula XI when more than one X substituent is present they may be the same or different. The same is true for the X' substituent. The X and X' substituents, if present, may be the same or different. Where b is zero in Formula XI the aromatic rings are directly joined with no intervening alkylene or other bridge.

Some illustrative non-limiting examples of suitable dihydric phenols of Formula XI include:
2,2-bis(4-hydroxyphenyl)propane (bisphenol-A);
1,1-bis(4-hydroxyphenyl)cyclohexane;
bis(3-methyl-4-hydroxyphenyl)methane;
4,4'-thiodiphenol;
bis(3,5-dimethyl-4-hydroxyphenyl)sulfone;
2,2-bis(3,3-dimethyl-4-hydroxyphenyl)propane;
2,2-bis(3-bromo-5-methyl-4-hydroxyphenyl)propane;
and the like.

The amount of at least one dihydric phenol of Formula I and/or II utilized in this embodiment of the invention is an amount effective to improve the heat resistance of the polyarylate. Generally this amount ranges from about 10 to about 90 weight percent, preferably from about 20 to about 80 weight percent, based on the total amount of dihydric phenols used.

The procedure for preparing the polyarylates of this embodiment is generally similar to that described hereinafore, with the exception that the dihydric phenol of Formula XI is present in the reaction mixture.

The polyarylates of this embodiment exhibit improved heat resistance as compared to conventional polyarylates while simultaneously retaining, to a substantial degree, substantially most of the advantageous properties of the conventional polyarylates.

The polyarylates of this embodiment may optionally have admixed therewith the various additives described hereinafore.

Yet another embodiment of the instant invention is a physical blend of (i) at least one polyarylate of the instant invention, i.e., one derived from (a) at least one dihydric phenol selected from dihydric phenols represented by Formulae I and II, and (b) at least one aromatic dicarboxylic acid (hereinafter referred to as polyarylate resin A); and (ii) at least one conventional polyarylate, i.e., one derived from (a) at least one aromatic dicarboxylic acid, and (b) at least one dihydric phenol represented by Formula XI (hereinafter referred to as polyarylate resin B).

These blends contain an amount of resin A effective to improve the heat resistance of said blends. Generally, this amount is in the range of from about 10 to about 90 weight percent, based on the total amount of resins A and B present in the blends.

The blends of this embodiment exhibit improved heat resistance than do blends of conventional polyarylates.

The method of blending resins A and B together is not critical and does not constitute part of this invention. One method of preparing the instant blends, for example, comprises blending the two resins in powder form or granular form, extruding the blend, chopping into pellets, and re-extruding.

The blends of the instant invention may optionally have admixed therewith the aforedescribed additives.

DESCRIPTION OF THE PREFERRED EMBODIMENT

The following examples are set forth to further illustrate the present invention and are not to be considered as limiting the invention thereto. Unless otherwise specified, where parts or percents are mentioned, they are parts or percents by weight.

EXAMPLE 1

This example illustrates the preparation of 4,4'-(cyclohexylmethylene)bisphenol, a dihydric phenol of Formula II.

Into a warm solution of 658.7 grams (7 moles) of molten phenol and 78.9 grams (0.7 mole) of cyclohexanecarboxaldehyde (hexahydrobenzaldehyde), placed into a 2 liter three-neck flask equipped with a stirrer, thermometer, reflux condenser and a gas-inlet tube reaching below the surface of the liquid, was introduced hydrogen chloride gas, while care was taken with the aid of a cold water cooling bath to maintain the temperature of the reaction mixture, which acquired a reddish orange color, between 34° and 45° C. After the solution became saturated with hydrogen chloride it was allowed to stand overnight at ambient temperatures, during which period white solids formed which were filtered off by suction and triturated with methylene chloride and filtered again. The resultant white crystals, which melted between 216° and 218° C., were recrystalized from methanol-water, after which they exhibited a melting point of 221°-222° C.

EXAMPLE 2

This example illustrates the preparation of a polyarylate of the instant invention.

To a slurry of 4.2 grams (0.015 mole) of 4,4'-(cyclohexylmethylene)bisphenol, prepared substantially in accordance with the procedure of Example 1, 0.03 grams (2 mole %) of triethylamine, 0.015 grams (1 mole %) of phenol, 400 ml of methylene chloride and 300 ml of water, there was added enough 25% aqueous sodium hydroxide solution to raise the pH to 11. Then a solution of 3.04 grams (0.015 mole) of isophthaloyl dichloride in 20 ml of methylene chloride was added during a 10 minute period, followed by stirring for a 10 minute period.

The methylene chloride phase was separated, washed with 0.01 N aqueous hydrochloric acid, followed by a wash with deionized water, then the organic layer was separated and dried by silica gel. Addition of an excess of methanol precipitated the polymer, which had a second order glass transition temperature of 216.8° C.

In contrast to the Tg of 216.8° C. of the instant polyarylate of Example 2 a conventional prior art polyarylate derived from bisphenol-A and isophthalic acid (isophthaloyl dichloride) exhibits a Tg of about 180° C. The instant polyarylates thus exhibit improved heat resistance, as evidenced by improved Tg's, over conventional prior art polyarylates.

It will thus be seen that the objects set forth above, among those made apparent from the preceding description are efficiently attained, and since certain changes may be made in carrying out the above processes and the compositions set forth without departing from the scope of the invention, it is intended that all matters contained herein shall be interpreted as illustrative and not in a limiting sense.

What is claimed is:

1. Polyarylate resin exhibiting improved heat resistance prepared by reacting
   (a) at least one aromatic dicarboxylic acid or an ester forming reactive derivative thereof; and
   (b) at least one dihydric phenol selected from dihydric phenols represented by the general formulae

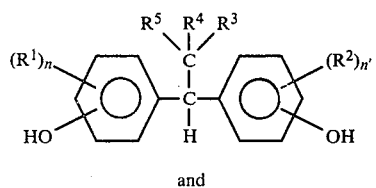

and

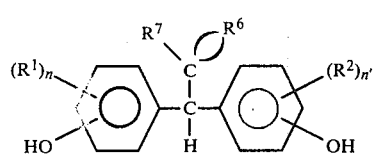

wherein:
   each $R^1$ is independently selected from halogen radicals, monovalent hydrocarbon radicals, and monovalent hydrocarbonoxy radicals;
   each $R^2$ is independently selected from halogen radicals, monovalent hydrocarbon radicals, and monovalent hydrocarbonoxy radicals;
   $R^3$, $R^4$ and $R^5$ are independently selected from monovalent hydrocarbon radicals;
   $R^6$ is selected from divalent hydrocarbon radicals that together with the carbon atom to which $R^6$ is bonded form a cycloaliphatic structure;
   $R^7$ is selected from hydrogen and monovalent hydrocarbon radicals; and
   n and n' are independently selected from whole numbers having a value of from 0 to 4 inclusive.

2. The resin of claim 1 wherein said monovalent hydrocarbon radicals represented by $R^1$ and $R^2$ are selected from alkyl radicals, aryl radicals, aralkyl radicals, alkaryl radicals, and cycloalkyl radicals.

3. The resin of claim 1 wherein said halogen radicals represented by $R^1$ and $R^2$ are selected from chlorine and bromine.

4. The resin of claim 1 wherein said monovalent hydrocarbonoxy radicals represented by $R^1$ and $R^2$ are selected from alkoxy radicals and aryloxy radicals.

5. The resin of claim 1 wherein said monovalent hydrocarbon radicals represented by $R^3$, $R^4$, $R^5$ and $R^7$ are selected from alkyl radicals, aryl radicals, alkaryl radicals, aralkyl radicals, and cycloalkyl radicals.

6. The resin of claim 5 wherein said divalent hydrocarbon radicals represented by $R^6$ are selected from alkylene radicals.

7. The resin of claim 5 wherein said monovalent hydrocarbon radicals are selected from alkyl radicals.

8. The resin of claim 1 wherein said dihydric phenol is selected from dihydric phenols represented by the general formula

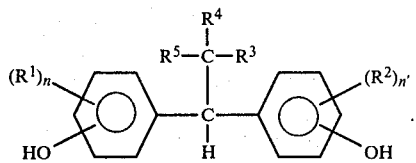

9. The resin of claim 8 wherein said monovalent hydrocarbon radicals represented by $R^3$, $R^4$ and $R^5$ are selected from alkyl radicals, aralkyl radicals, alkaryl radicals, aryl radicals, and cycloalkyl radicals.

10. The resin of claim 1 wherein said dihydric phenol is selected from dihydric phenols represented by the general formula

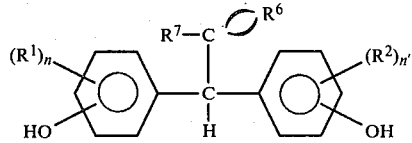

11. The resin of claim 10 wherein said monovalent hydrocarbon radicals represented by $R^7$ are selected from alkyl radicals, aryl radicals, alkaryl radicals, aralkyl radicals, and cycloalkyl radicals.

12. The resin of claim 11 wherein said divalent hydrocarbon radicals represented by $R^6$ are selected from alkylene radicals.

13. The resin of claim 12 wherein said monovalent hydrocarbon radicals represented by $R^1$ and $R^2$ are selected from alkyl radicals, aryl radicals, aralkyl radicals, alkaryl radicals, and cycloalkyl radicals.

14. The resin of claim 13 wherein said divalent hydrocarbon radical represented by $R^6$ is pentylene.

15. The resin of claim 14 wherein $R^7$ is hydrogen.

16. The resin of claim 14 wherein said reactive derivative of said aromatic dicarboxylic acid is isophthaloyl dichloride.

17. The compositions of claim 16 wherein n and n' are both zero.

18. The resin of claim 1 which is prepared by reacting
(a); an amount of (b) effective to improve the heat resistance thereof; and (c) at least one dihydric phenol represented by the general formula

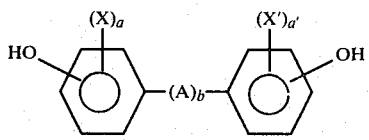

wherein:
A is selected from straight chain alkylene radicals containing from 2 to about 6 carbon atoms, straight chain alkylidene radicals containing from 1 to about 6 carbon atoms, cycloalkylene radicals containing from 4 to about 7 ring carbon atoms, cycloalkylidene radicals containing from 4 to about 7 ring carbon atoms,

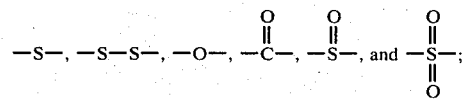

each X is independently selected from halogen radicals, monovalent hydrocarbon radicals, and monovalent hydrocarbonoxy radicals;

each X' is independently selected from halogen radicals, monovalent hydrocarbon radicals, and monovalent hydrocarbonoxy radicals;
b is either zero or one; and
a and a' are independently selected from whole numbers having a value of from 0 to 4 inclusive.

19. The resin of claim 18 wherein said amount is in the range of from about 10 to about 90 weight percent, based on the total amount of dihydric phenols utilized.

20. The resin of claim 19 wherein b is one.

21. The resin of claim 20 wherein A is selected from alkylene radicals, alkylidene radicals, cycloalkylene radicals, and cycloalkylidene radicals.

22. The resin of claim 21 wherein said dihydric phenol of (b) is selected from dihydric phenols represented by the general formula

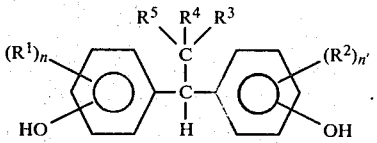

23. The resin of claim 22 wherein said dihydric phenol of (b) is selected from dihydric phenols represented by the general formula

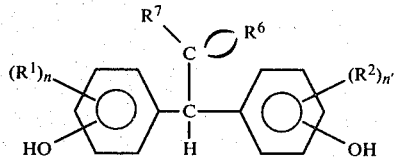

wherein said divalent hydrocarbon radicals represented by $R^6$ are selected from alkylene radicals.

24. The resin of claims 9 wherein said dihydric phenol is a 4,4'-bisphenol.

25. The resin of claims 13 wherein said dihydric phenol is a 4,4'-bisphenol.

* * * * *